United States Patent [19]

Asano

[11] 4,343,278
[45] Aug. 10, 1982

[54] CONTROL DEVICE FOR AN INTERNAL COMBUSTION ENGINE

[75] Inventor: Masaharu Asano, Yokosuka, Japan

[73] Assignee: Nissan Motor Co., Ltd., Yokohama, Japan

[21] Appl. No.: 173,757

[22] Filed: Jul. 30, 1980

[30] Foreign Application Priority Data

Jul. 31, 1979 [JP] Japan ................................. 54/97940

[51] Int. Cl.³ .......................... G01L 23/22; F02P 5/04; F02P 5/14
[52] U.S. Cl. .................................... 123/425; 123/435; 123/419; 123/422; 123/423; 73/35
[58] Field of Search .............. 123/425, 435, 419, 422, 123/423, 440; 73/35

[56] References Cited

U.S. PATENT DOCUMENTS

| | | | |
|---|---|---|---|
| 2,450,882 | 10/1948 | Costa | 123/435 |
| 4,012,942 | 3/1977 | Harned | 123/425 |
| 4,133,475 | 1/1979 | Harned et al. | 123/425 |
| 4,261,313 | 4/1981 | Iwata et al. | 123/425 |
| 4,274,379 | 6/1981 | Iwata et al. | 123/425 |

FOREIGN PATENT DOCUMENTS

| | | | |
|---|---|---|---|
| 1529364 | 10/1978 | United Kingdom | 123/425 |
| 2022828 | 12/1979 | United Kingdom | 123/425 |
| 2024317 | 1/1980 | United Kingdom | 123/425 |

Primary Examiner—Raymond A. Nelli
Attorney, Agent, or Firm—Schwartz, Jeffery, Schwaab, Mack, Blumenthal & Koch

[57] ABSTRACT

A control device for an internal combustion engine is disclosed in which an ignition timing, etc. is feedback-controlled according to the detected knocking state. An output signal of a knocking sensor is half-wave rectified by a signal treating section and smoothed by a smoothing section to obtain a first reference signal. The rectified signal and the smoothed signal thereof are then compared by a first comparator section and the difference signal thus obtained is integrated by an integrator section to obtain a signal substantially depending on the strength of the knocking. The first reference signal is also applied to a function generator which generates a second reference signal as a function of the first reference signal and also corresponds to the components caused by the factors other than the knocking. Finally the integrated signal and the second reference signal are compared by a second comparator section to produce a correct knocking detection signal.

7 Claims, 8 Drawing Figures

CONTROL DEVICE FOR AN INTERNAL COMBUSTION ENGINE

BACKGROUND OF THE INVENTION

The present invention relates to a control device for an internal combustion engine for detecting a knocking state produced in the engine and feedback-controlling the ignition timing, etc. to an optimum value in response to the knocking state.

It has been known that a continuation of a strong knocking state adversely affects the durability of the engine, etc., but a slight knocking state produced in a comparatively low RPM range improves output power and fuel consumption characteristics of the engine. Further, it has been known that the ignition timing is closely related to the occurrence of the knocking and in general, the more the ignition timing is advanced the more the knocking tends to occur.

Accordingly, a control device has been proposed in which in order to improve fuel consumption and output characteristics of the engine a knocking state produced in the engine is detected and the ignition timing is advanced and delayed in response to the detected knocking state so as to maintain a slight knocking condition.

Such a known device is based on the fact that when a knocking occurs in an engine, pressure changes are produced in the combustion chamber and pressure vibration components having a particular frequency are increased. In this known device a sensor for detecting the vibrations of engine body caused by the pressure changes in the combustion chamber is provided, from the detected signal of which sensor the particular frequency components are selected and the knocking state is detected from the magnitude of the selected particular frequency components.

In practice, however, the vibrations produced by the other factors than the knocking such as the movement of intake and exhaust valves and the rotation of a crank shaft include some vibration components having a frequency corresponding to said particular frequency, so that as the rotation speed of the engine increases the vibrations of the engine body and also the magnitude of the selected particular frequency components increase.

Therefore, in order to detect the knocking state correctly, the vibration components caused by the factors other than the knocking which increase with an increase in the engine rotation speed should be subtracted from the magnitude of the selected particular frequency components.

In the above mentioned prior art device, however, the subtraction of the components caused by the factors other than the knocking from the selected components is insufficient at a high rotation speed of the engine. Therefore, the prior art devices have a problem in that at a high rotation speed, the accuracy of the feedback control deteriorates and the ignition timing cannot be advanced properly.

SUMMARY OF THE INVENTION

It is an object of the invention to solve the above mentioned problem and to provide an improved control device in which the knocking state, in particular at high rotation speed, can be detected with high accuracy and the ignition firing condition can be feedback-controlled in optimum manner over the whole engine rotation speed range.

A control device according to the present invention comprises: detecting means for detecting a particular frequency component caused by the knocking from pressure changes produced in the combustion chamber or vibrations caused by the pressure changes; signal treating means for rectifying the detected signal from said detecting means; smoothing means for smoothing the rectified signal from said signal treating means to obtain a first reference signal; a first comparing means for comparing said first reference signal and said rectified signal; integrating means for integrating the output signal of said comparing means; a function generator for generating a second reference signal in response to said first reference signal; a second comparing means for comparing the integrated signal from said integrating means and said second reference signal; operating and controlling means for feedback-controlling at least one of an ignition timing, an exhaust gas recirculation flow rate, a fuel injection amount and/or a fuel injection timing in response to the output signal from said second comparing means.

A further control device according to the present invention comprises: detecting means for detecting a particular frequency component caused by the knocking from pressure changes produced in the combustion chamber or vibrations caused by the pressure changes; signal treating means for rectifying the detected signal from said detecting means; smoothing means for smoothing the rectified signal from said signal treating means to produce a first reference signal; a first comparing means for comparing said first reference signal and said rectified signal; integrating means for integrating the output signal from said comparing means; speed detecting means for generating a speed representing signal depending on the rotation speed of the engine; a function generator for generating a second reference signal in response to said speed representing signal; a second comparing means for comparing the integrated signal from said integrating means and said second reference signal; operating and controlling means for feedback-controlling at least one of an ignition timing, an exhaust gas recirculation flow rate, a fuel injection amount and a fuel injection timing in response to the output signal from said second comparing means.

BRIEF DESCRIPTION OF THE DRAWINGS

FIGS. 5b and 5c show embodiments of the function generator in the second comparator section in the embodiment of FIG. 5a.

DETAILED DESCRIPTION OF THE PREFERRED EMBODIMENTS

Figure 1:
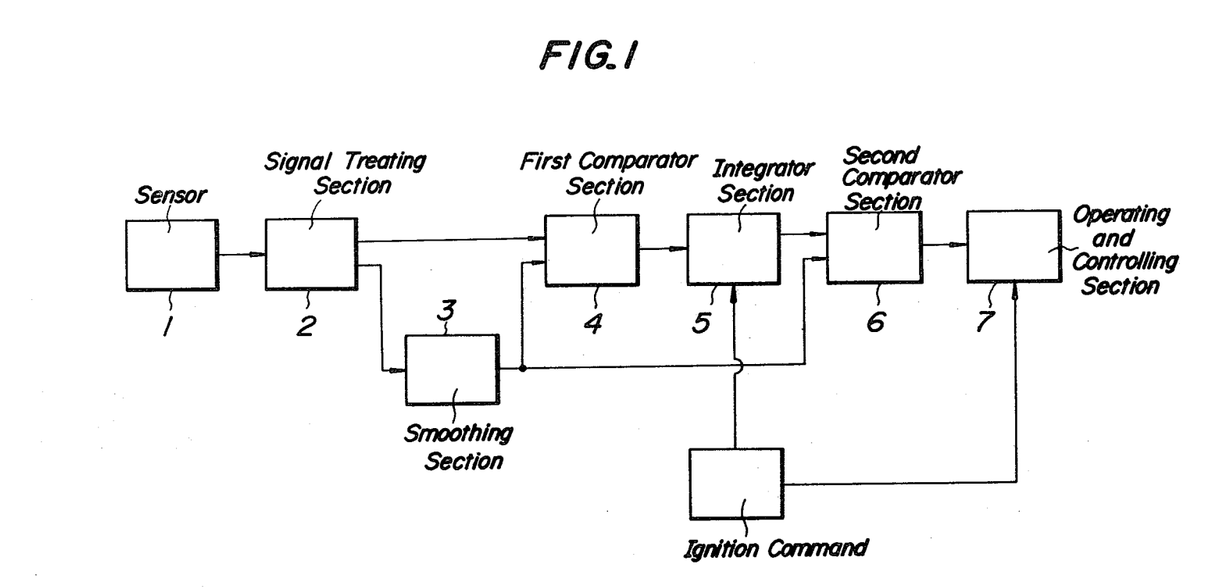
FIG. 1 is a block diagram illustrating an embodiment of the invention.

FIG. 1 is a block diagram illustrating the preferred embodiment of the invention.

A sensor 1 converts pressure changes produced in the combustion chamber or various vibrations caused by the pressure changes (for example, vibrations of the engine body, acoustic waves generated from the engine body and the like) into an electric signal.

Since the output signal of the sensor 1 includes frequency components independent of the knocking produced in the engine, the output signal of the sensor 1 must be passed through a bandpass filter, whose the resonance frequency corresponds to a particular frequency related to the knocking, to select the particular frequency components caused by the knocking.

However, when the sensor 1 consists of a resonance type vibration sensor whose resonance frequency corresponds to said particular frequency, the sensor 1 has a selecting or filtering function and thus the bandpass filter is not required.

Figure 2:
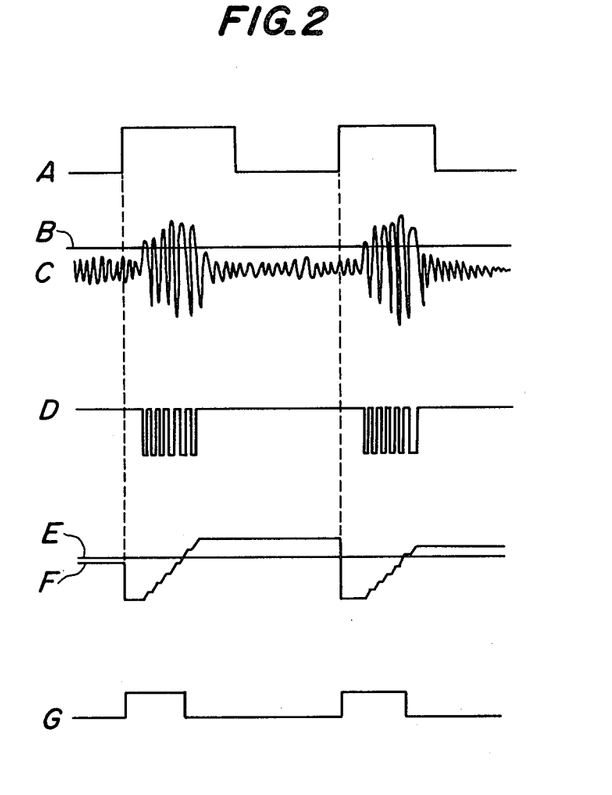
FIG. 2 is a timing chart illustrating the operation of the embodiment of FIG. 1.

Such a resonance type sensor 1 produces an increasing output signal in amplitude as shown in FIG. 2C when a knocking occurs in the engine.

A signal treating section 2 amplifies the output signal of the sensor 1 and then half-wave rectifies (detects) the amplified signal.

A smoothing section 3 smoothes the rectified signal from the signal treating section 2 and then amplifies the smoothed signal to a predetermined level to produce a first reference signal as shown in FIG. 2B, from which a second reference signal for detecting the knocking is derived as described in hereinafter.

A first comparator section 4 compares the half-wave rectified signal from the signal treating section 2 with the reference signal from the smoothing section 3 and produces a signal which goes low or changes each time the former signal exceeds the latter signal, that is, it produces a sequence of negative pulses as shown in FIG. 2D.

As mentioned above, if a strong knocking occurs, the output of the sensor 1 increases in amplitude so that the number of pulses and the pulse width of individual pulses of the sequence of pulses produced by the comparator section 4 are increased according to the strength of knocking. Therefore, the integrated value of the sequence of pulses is increased according to the strength of knocking, so that the knocking state can be detected from this integrated value.

Figure 3:
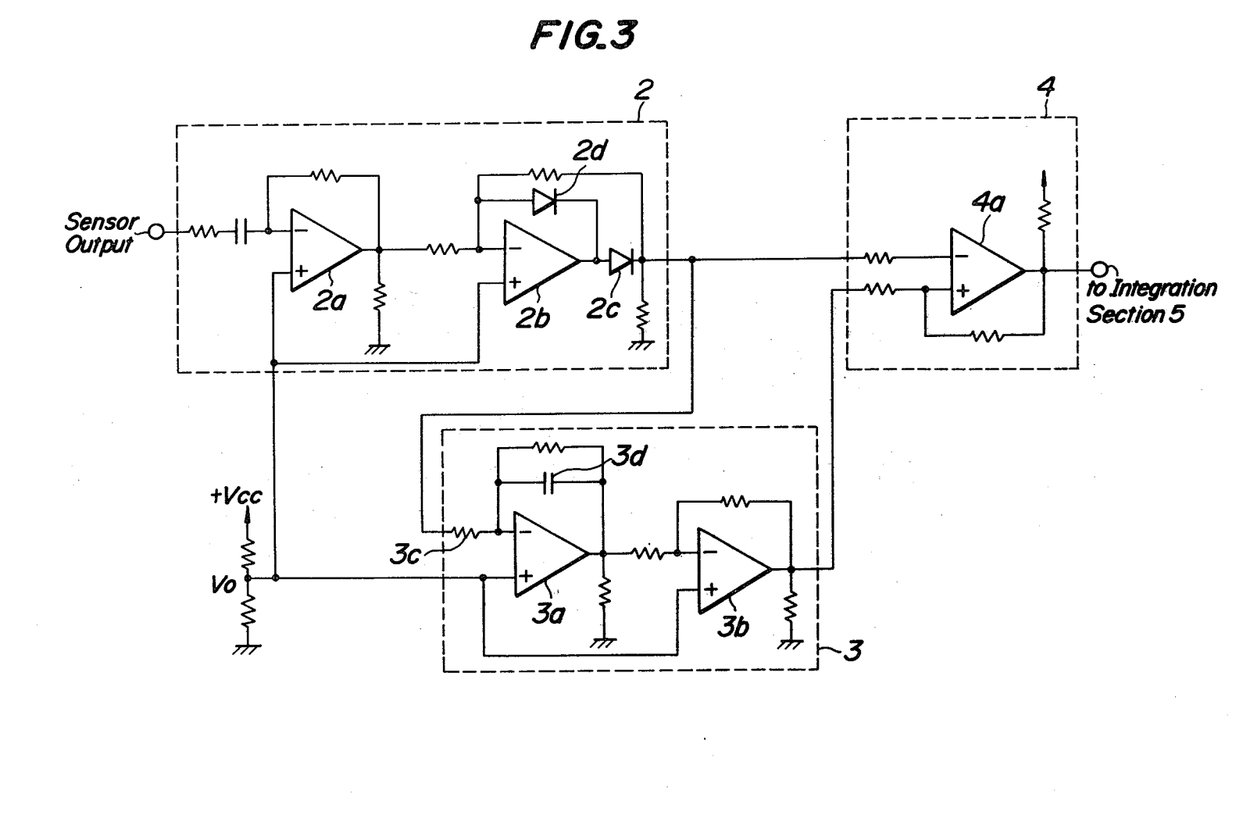
FIG. 3 is a detailed circuit diagram of the signal treating section, the smoothing section and the comparator section in the embodiment of FIG. 1.

The signal treating section 2, the smoothing section 3 and the comparator section 4 can be realized as shown in FIG. 3. In this figure, 2a, 2b, 3a and 3b are operational amplifiers for amplification or buffering, 4a is an operational amplifier for comparison, 2d and 2c are diode for rectifying, and 3c and 3d are a resistor and a capacitor for smoothing.

An integrator section 5 integrates the sequence of negative pulses (FIG. 2D) depending on the strength of the knocking and supplied by the comparator section 4 to produce an integrated signal as shown in FIG. 2F.

A second comparator section 6 forms a second reference signal (FIG. 2E) which varies as a function of the first reference signal from the smoothing section 3 and compares the second reference signal with the integrated signal (FIG. 2F) from the integrator 5 to produce a knocking detection signal as shown in FIG. 2G which signal goes low (to its minimum value), when the latter signal exceeds the former signal, thereby to indicate the occurrence of the knocking.

Figure 4A:
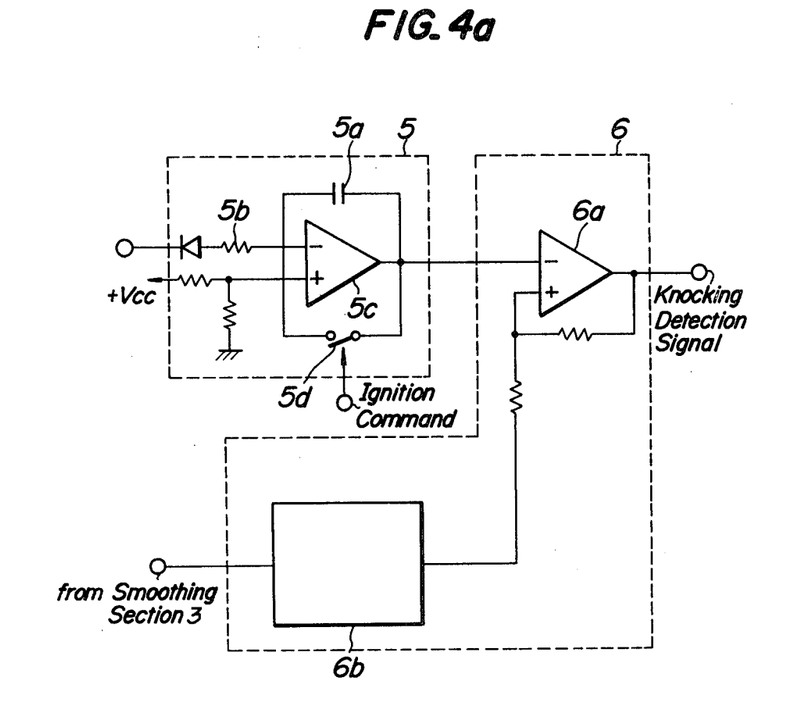
FIG. 4a is a detailed circuit diagram of the integrator section and the second comparator section in the embodiment of FIG. 1.

The integrator section 5 and the comparator section 6 can be realized as shown in FIG. 4a.

That is, the integrator section 5 comprises an integrator circuit comprising a capacitor 5a, a resistor 5b and an operational amplifier 5c, etc. in which the sequence of negative pulses (FIG. 2D) from the comparator section 4 is integrated with a given integration rate determined by the capacitor 5a and the resistor 5b, as shown in FIG. 2F.

Then, a switch 5d in the integrator circuit is closed by an ignition command pulse (FIG. 2A) at its leading edge. This pulse is generated in synchronism with the rotation of the crank shaft. As a result of this pulse, the capacitor 5a is short circuited so that the integrated signal (FIG. 2F) is reset to zero at each time of ignition.

The comparator section 6 comprises a comparator circuit comprising an operational amplifier 6a and a function generator 6b, etc. which in order to achieve a correct knocking detection, substracts the components which are caused by factors other than the knocking and which increase with increasing rotation speed of engine, from the integrated signal from the integrator 5 which represents the knocking state. The function generator 6b produces a second reference signal (FIG. 2E) as a function of the first reference signal from the smoothing section 3 which represents the components caused by factors other than the knocking, whilst the operational amplifier 6a compares this second reference signal with said integrated signal to produce a knocking detection signal (FIG. 2G) which becomes low (or reverts to its minimum value) when the knocking occurs.

Figure 4B:
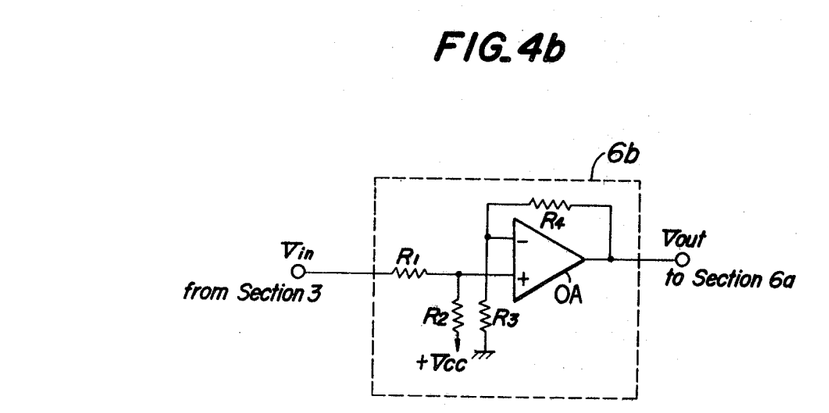
FIG. 4b shows an embodiment of the function generator in the second comparator section.

The function generator 6b may be formed as shown in FIG. 4b by a voltage conversion circuit comprising an operational amplifier OA having resistors $R_1 \sim R_4$. The output voltage of this circuit is as follows:

$$V_{out} = \frac{R_3 + R_4}{R_1 + R_2}\left(\frac{R_2}{R_3}V_{in} + \frac{R_1}{R_3}V_{cc}\right)$$

Thus, a desired second reference signal can be obtained from the first reference signal from the section 3 by selecting or adjusting the values of the resistors $R_1 \sim R_4$.

An operating and control section 7 feedback-controls at least one of an ignition timing, an exhaust gas recirculation flow rate for reduction of NOx products, a fuel injection amount and a fuel injection timing, etc. in response to the resultant knocking detection signal (FIG. 2G) from the comparator section 6 so as to maintain the firing condition in optimum condition.

In this embodiment the operating and control section 7 feedback-controls only the ignition timing. When the comparator section 6 produces the knocking detection signal (FIG. 2G) a first next ignition angle position of engine after the signal is delayed by a predetermined angle relative to the preceding ignition angle position. When the comparator section 6 does not produce the knocking detection signal, the successive ignition angle positions are successively advanced by a predetermined angle.

Thus, the successive ignition angle positions are successively advanced by a predetermined angle until the knocking occurs, at which time the next ignition angle position is delayed by a predetermined angle so that the ignition timing is feedback-controlled at a point near the threshold of producing the knocking (in other words a slight knocking condition), as a result of which the fuel consumption and the engine output characteristics are improved.

As mentioned above, the output signal of the sensor 1 increases with increasing the rotation speed of engine because the vibrations caused by the factors other than the knocking increase. Therefore, if the second reference signal level in the comparator section 6 for detecting the knocking is determined without taking into account this fact, the knocking could not be detected correctly.

In other words, according to the above-mentioned circuit arrangement, in the comparator section 6, the second reference signal corresponding to the components caused by factors other than the knocking is subtracted from the integrated signal of the integrator section 5 depending on the output signal of the sensor 1 so as to obtain the components caused by the knocking and to detect the knocking from the magnitude of the resultant components. Therefore, if the second reference signal does not correspond to the components caused by the factors other than the knocking, the knocking will not be detected correctly.

However, in the prior art this second reference signal is fixed at a constant level. Therefore, when this second reference signal is determined, the knocking can be detected correctly in a low speed range; however, the accuracy of detecting the knocking deteriorates in a high speed range.

On the contrary, in the above-mentioned embodiment according to the invention, the function generator 6b in the comparator section 6 operates to generates the second reference signal, which depends on the first reference signal from the smoothing section 3, depending on the output signal of the sensor 1 and corresponding to the components caused by factors other than the knocking. As a result, the second reference signal correctly corresponds, independently of the engine rotation speed, to the components caused by the factors other than the knocking and thus a high accuracy of detecting the knocking is obtained in the whole rotation speed range.

As a result of this, the ignition timing can be feedback-controlled at an optimum timing with very high accuracy, so that fuel consumption and output power characteristics of engine are more improved.

Figure 5A:
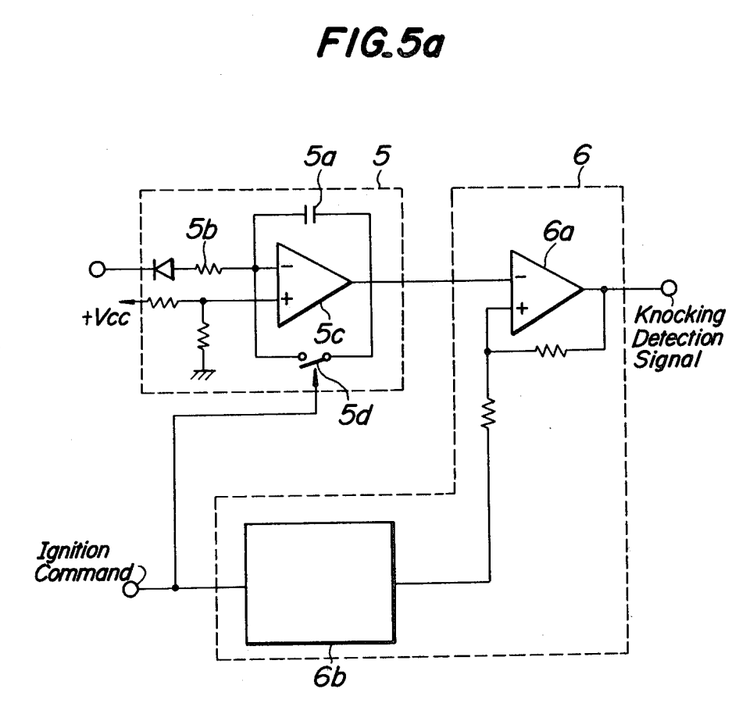
FIG. 5a is a block diagram illustrating an essential portion of an another embodiment of the invention.

FIG. 5a shows an essential portion of an another embodiment of the invention. In this embodiment, based upon the fact that the vibration components caused by the factors other than the knocking increasing with the increase rotation speed of engine, the second reference signal is not obtained in the function generator 6b provided in the comparator section 6 from the first reference signal of the smoothing section 3, but from the ignition command pulses (FIG. 2A) in relation to the rotation speed.

Figure 5B:
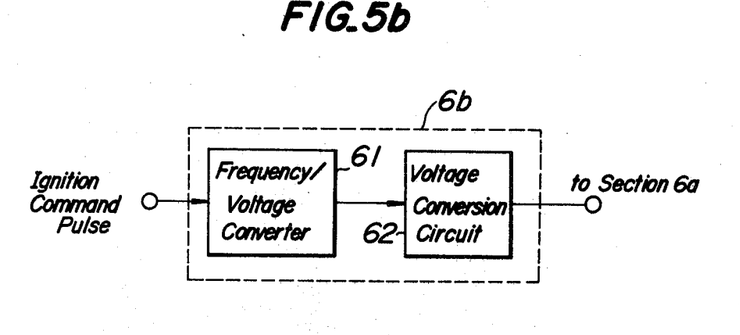

The function generator 6b in this embodiment may be formed as shown in FIG. 5b by a frequency-voltage converter 61 and a voltage conversion circuit 62, for example, as shown in FIG. 4b. The frequency-voltage converter 61 converts the frequency of the ignition command pulses to an equivalent voltage. This voltage is applied to the voltage conversion circuit 62 which produces a desired second reference signal.

Figure 5C:
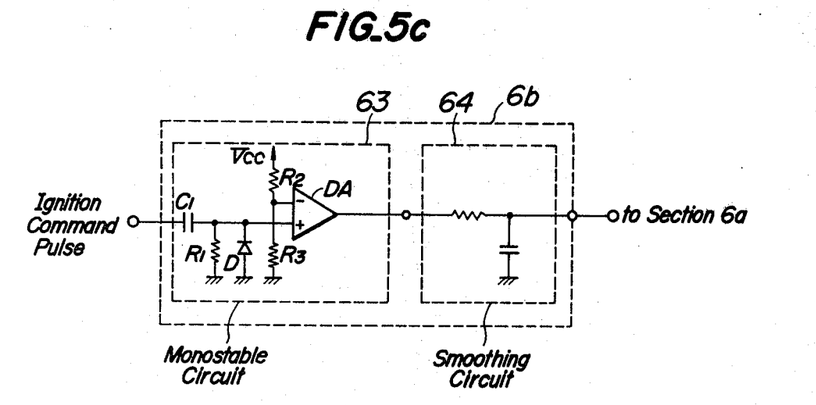

Alternatively, the function generator 6b may be formed as shown in FIG. 5c by a monostable circuit 63 and a smoothing circuit 64. The monostable circuit may be formed, for example, by a differential amplifier DA having an input circuit $C_1$, $R_1$, D for differentiating the ignition command pulses and a reference voltage input circuit $R_2$, $R_3$. In operation, the output of the differential amplifier becomes high during the differentiated pulses of each ignition command pulse which exceed the reference voltage, so that the differential amplifier produces, in response to each ignition pulse, pulses having a constant width determined by the values of the elements $C_1$ and $R_1$ and the reference voltage. The smoothing circuit 64 smoothes these pulses, so that the smoothed level thus obtained varies in proportion to the variation of the repetition rate of the ignition pulses and hence the rotation speed of the engine and can be used as the desired second reference signal.

This embodiment is same in the other construction as the first embodiment shown in FIG. 1 and has the same advantageous effects.

In the above embodiments only the ignition timing is feedback-controlled, but an exhaust gas recirculation flow rate, a fuel injection amount or a fuel injection timing can also be feedback-controlled in response to the knocking detection signal so as to maintain the firing condition at an optimum condition.

As explained in the foregoing, according to the invention, the firing condition in the combustion chamber is feedback controlled to an optimum condition and thus the fuel consumption and the output power characteristics of engine are more improved.

What is claimed is:

1. A control device for an internal combustion engine comprising:
    detecting means for detecting a signal corresponding to a particular frequency component caused by the knocking from pressure changes produced in the combustion chamber or vibrations caused by the pressure changes;
    signal treating means for rectifying the detected signal from said detecting means;
    smoothing means for smoothing the rectified signal from said signal treating means to obtain a first reference signal;
    a first comparing means for comparing said first reference signal and said rectified signal;
    integrating means for integrating the output signal of said comparing means;
    a function generator for generating a second reference signal in response to said first reference signal;
    a second comparing means for comparing the integrated signal from said integrating means and said second reference signal;
    operating and controlling means for feedback-controlling at least one of an ignition timing, an exhaust gas recirculation flow rate, a fuel injection amount and a fuel injection timing in response to the output signal from said second comparing means.

2. A control device for an internal combustion engine comprising:
    detecting means for detecting a signal corresponding to a particular frequency component caused by the knocking from pressure changes produced in the combustion chamber or vibrations caused by the pressure changes;
    signal treating means for rectifying the detected signal from said detecting means;
    smoothing means for smoothing the rectified signal from said signal treating means to produce a first reference signal;
    a first comparing means for comparing said first reference signal and said rectified signal;

integrating means for integrating the output signal from said comparing means;

speed detecting means for generating a speed representing signal depending on the rotation speed of the engine;

a function generator for generating a second reference signal in response to said speed representing signal;

a second comparing means for comparing the integrated signal from said integrating means and said second reference signal;

operating and controlling means for feedback-controlling at least one of an ignition timing, an exhaust gas recirculation flow rate, a final injection amount and a fuel injection timing in response to the output signal from said second comparing means.

3. A control device as claimed in claims 1 and 2, wherein said signal treating means comprises a rectifying circuit for half-wave rectifying the detected signal from said detecting means.

4. A control device as claimed in claim 3, wherein said first comparing means comprises a comparator which compares the half-wave rectified signal from said rectifying circuit with said first reference signal and whose output changes when the former signal exceeds the latter signal to produce a series of negative pulses.

5. A control device as claimed in claim 4, wherein said integrating means comprises an integrator which integrates said series of negative pulses from said comparator and is reset in response to each ignition command pulse at its leading edge.

6. A control device as claimed in claim 5, wherein said function generator is operative to generate a second reference signal correctly corresponding to components caused by factors other than knocking over a range of rotation speed of the engine.

7. A control device as claimed in claim 6, wherein said operating and controlling means feedback-controls the ignition timing in response to the output signal from said second comparing means in such manner that when said second comparing means does not produce an output signal the successive ignition angle positions are successively advanced by a predetermined angle and when said second comparing means produces an output signal a first next ignition angle position is delayed by a predetermined angle relative to the preceding ignition angle position, whereby the ignition timing is feedback-controlled at optimum timing in the whole speed range.

* * * * *